United States Patent

Becker et al.

[11] Patent Number: 5,538,127
[45] Date of Patent: Jul. 23, 1996

[54] DEVICE FOR TRANSFERRING LOAD CARRIERS BETWEEN CONVEYORS PATHS ARRANGED AT AN ANGLE RELATIVE TO ONE ANOTHER

[75] Inventors: Klaus Becker; Rüdiger Ostholt, both of Wetter; Klaus Wenke, Sprockhövel, all of Germany

[73] Assignee: Mannesmann Aktiengesellschaft, Dusseldorf, Germany

[21] Appl. No.: 263,535

[22] Filed: Jun. 22, 1994

[30] Foreign Application Priority Data

Jun. 22, 1993 [DE] Germany ............ 43 21 491.6

[51] Int. Cl.$^6$ ............................................. B65G 47/46
[52] U.S. Cl. ........................ 198/370.08; 198/465.1; 198/465.2
[58] Field of Search ................... 198/370.08, 465.1, 198/465.2, 370.1

[56] References Cited

U.S. PATENT DOCUMENTS

| | | |
|---|---|---|
| 3,410,225 | 11/1968 | Saunders, Jr. . |
| 3,701,407 | 10/1972 | Kulig . |
| 3,709,381 | 1/1973 | Sullivan et al. ............ 198/370.08 |
| 4,033,862 | 7/1977 | Spencer ..................... 198/370.1 |
| 4,633,996 | 1/1987 | Waterhouse ................ 198/370.1 |
| 5,062,368 | 11/1991 | Sticht et al. ............... 198/465.1 |

FOREIGN PATENT DOCUMENTS

| | | |
|---|---|---|
| 0322313 | 6/1989 | European Pat. Off. . |
| 2668758 | 5/1992 | France . |

*Primary Examiner*—Joseph E. Valenza
*Attorney, Agent, or Firm*—Cohen, Pontani, Lieberman, Pavane

[57] ABSTRACT

A device for transferring load carriers between conveyor paths arranged at an angle relative to one another. The device has at least one guide element which is movable by a drive in the transporting path of the load carriers on a first conveyor path and in the direction of a second conveyor path for transferring the load carriers into the second conveyor path. In order to enable a reliable transfer of the load carriers and a high transfer capacity at the same time, the guide element is constructed as a driver which can move into a recess in the load carrier in a positive-locking manner for the transfer process.

12 Claims, 3 Drawing Sheets

DEVICE FOR TRANSFERRING LOAD CARRIERS BETWEEN CONVEYORS PATHS ARRANGED AT AN ANGLE RELATIVE TO ONE ANOTHER

BACKGROUND OF THE INVENTION

1. Field of the Invention

The invention is directed to a device for transferring load carriers between conveyor paths which are arranged at an angle relative to one another.

2. Description of the Prior Art

A device for guiding individual piece goods from a feed belt to an adjoining branch conveyor path is known from DE 32 41 100 A1. The guiding process is effected by a deflecting roller that presses the piece good to be transferred laterally out from the feed belt in the direction of the adjoining conveyor path. The deflecting rollers are arranged at the ends of a three-armed star wheel which is supported so as to be rotatable around a vertical axis adjacent to the feed belt. A robber-coated transport roller which is driven around a horizontal axis is provided at the start of the branch conveyor path to support the deflecting process. The deflected piece good is grasped by the transport roller and transported onward in the direction of the branch conveyor path.

This transfer device has proven disadvantageous, since the star wheel, together with the deflecting rollers, necessitates a large constructional width so that it is not possible to arrange another conveyor path immediately adjacent thereto. Moreover, the reliability of the transfer process is influenced by the friction ratios between the support surface of the piece good and the surface of the conveyor belt so that a transfer of the piece good may fail under unfavorable friction ratios.

Furthermore, a deflecting device for optional deflection of objects from a belt conveyor to a roller conveyor arranged at an angle thereto is known from EP 0094012 B1. This deflecting device substantially comprises a plurality of pairs of driven rollers which are arranged adjacent to one another so as to be distributed along the width of the belt conveyor and in the branch region between the belt conveyor, which is divided into two portions. Each pair of rollers has rollers which are arranged one after the other at a distance as seen in the transporting direction of the belt conveyor. These rollers project into the transporting plane of the belt conveyor. In order to deflect the transported objects the roller pairs can be swiveled out of their position parallel to the transporting direction of the belt conveyor into the direction of the branch roller conveyor.

This deflecting device also proves disadvantageous in that the deflecting capacity of the device is restricted by the required return swiveling process of the pair of rollers and the belt conveyor path must be interrupted for the deflecting device.

SUMMARY OF THE INVENTION

Accordingly, it is an object of the present invention to provide a device for transferring load carriers between conveyor paths arranged at an angle relative to one another, which device simultaneously enables a reliable transfer of the load carriers and a high transfer capacity.

Pursuant to this object, and others which will become apparent hereafter, one aspect of the present invention resides in a device having at least one movable driver that engages in a recess of the load carrier for transfer thereof. A drive moves the driver in a transporting direction of the load carrier in a first conveyor path and in the direction of the second conveyor so as to transfer the load carriers.

The basic idea of the invention is that the load carriers, in particular containers for pieces of luggage, are provided with a recess in which a driver of the transfer device can engage in a frictional-locking manner between two conveyor paths. The fictional engagement between the driver and the load carrier during the transfer process ensures reliable transfer of the load carrier, since this type of transfer is to a great extent unaffected by the fluctuating friction ratios between the load carriers and conveyor path or conveyor belt. By arranging the recess in the base or in the support surface of the load carrier so that the driver accordingly moves into the recess from below for the transferring process, it is possible to arrange the transfer device below the conveyor paths and the driver therefore does not project out laterally over the contour of the conveyor paths and economizes on space. Accordingly, a plurality of conveyor paths can be arranged next to one another in a compact and closely adjoining arrangement.

The construction of the recess as a groove connecting the end sides of the load carrier and extending in the longitudinal direction of the load carrier proves particularly advantageous, since this groove can also be used for guiding the load carrier outside the transfer device. Moreover, the elongate construction of the driver which swivels easily within the groove during the transfer process results in a frictional-locking, in particular a clamping, two-point support of the driver at the groove and accordingly ensures a reliable frictional-locking connection between the driver and the load carrier.

The frictional-locking connection between the driver and the groove is improved when the driver is formed by two parts which are constructed in the shape of plates in particular and are arranged one after the other at a distance from one another in the transfer direction. Owing to the distance between the two parts of the drivers, which is preferably less than one third of the length of the load carrier, the distance between the two points at which the driver contacts the groove is enlarged. The guidance of the driver proceeding from the first guide path along a curved guide rail in the direction of the second guide path makes it possible to guide the load carrier at a calculated and preselected conveyor speed in the direction of the second conveyor path. When the curvature of the guide path is constructed so as to increase portionwise or continuously in the transfer direction, transfer from the first transporting direction into the second transporting direction may be carried out virtually without jolts. Accordingly, it can be ensured that the centrifugal forces acting on the piece of luggage arranged on the load carrier will not cause the piece of luggage to be thrown off. Furthermore, the driver is advantageously driven via a traction mechanism constructed as a chain, the chain being guided via pins in guide grooves which are incorporated in the guide rail of the transfer device. This construction is economical and at the same time generates little noise. By constructing the chain as a commercial side curve chain, it can be guided along the curved guide rail.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

3

DETAILED DESCRIPTION OF THE PREFERRED EMBODIMENTS

Figure 1:
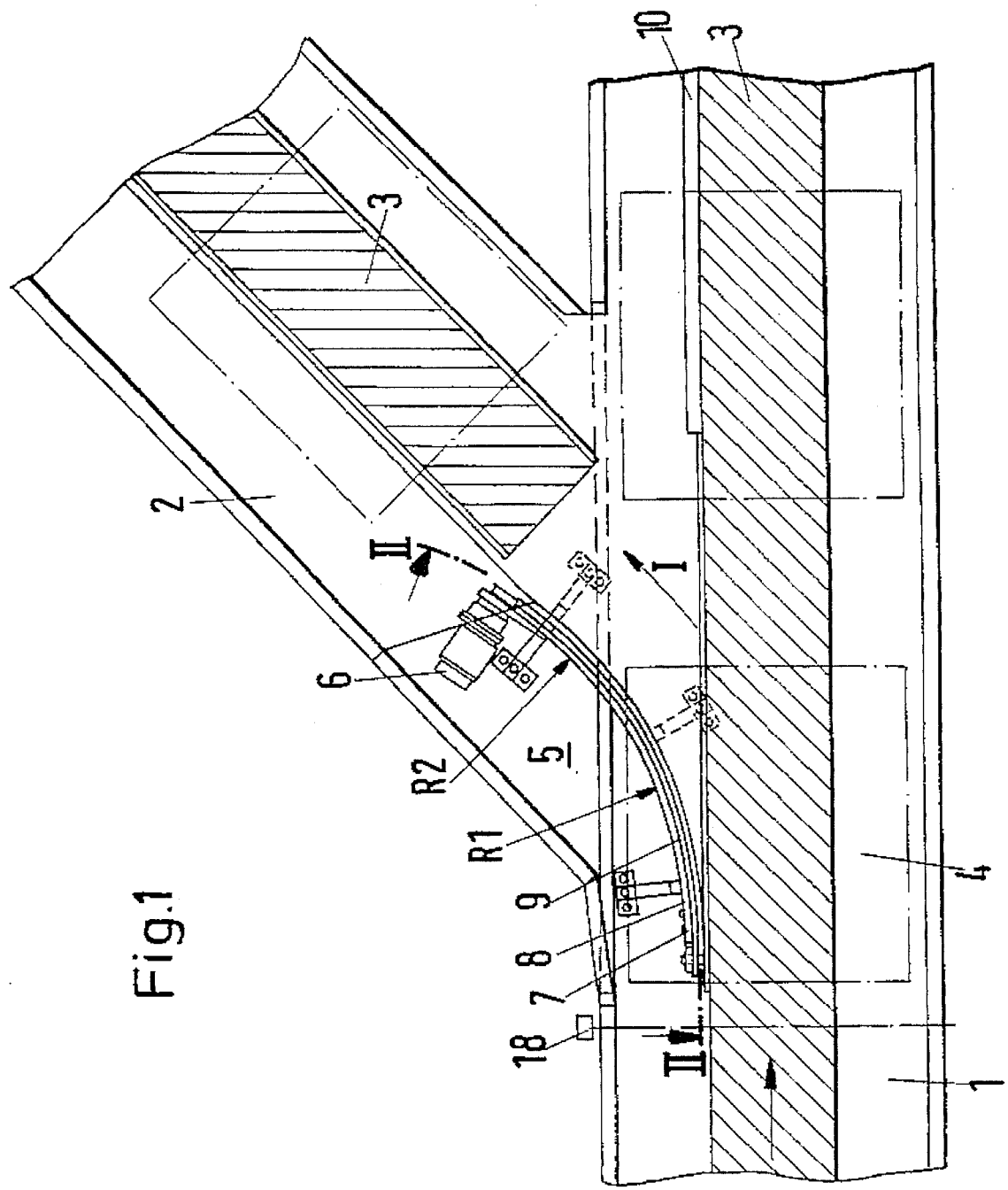
FIG. 1 shows a top view of a branch-off region of two conveyor paths with a transfer device according to the present invention.

FIG. 1 shows a top view of a first conveyor path 1 adjoined at an angle of 45° by a second conveyor path 2. The conveyor paths 1, 2 are constructed as belt conveyors, the width of the conveyor belt 3 corresponding to approximately half that of a load carrier 4 to be transported thereon. The load carriers 4 are accordingly supported on the conveyor belt 3 only in the central region of their support surface 13 (see FIG. 2). A transfer device 5 for the load carriers 4 is arranged between the first conveyor path 1 and the second conveyor path 2. The transfer device 5 substantially has a drive 6 constructed as an electric motor for a guide element 7 by means of which a load carrier 4 can be guided from the first conveyor path 1 to the second conveyor path 2 via a frictional-locking connection between the load carrier 4 and the guide element 7. The guide element 7 is constructed as a driver 7 which is movable proceeding from a position laterally adjacent to the conveyor belt 3 of the first conveyor path 1. The side of the driver 7 facing the second conveyor path 2 is movable in the direction of the commencement of the second conveyor path 2.

The driver 7 is connected with the drive 6 via a circulating traction mechanism 8 which is constructed in particular as a side curve chain. The traction mechanism 8 is guided along a guide rail 9 which is curved in a sine shape and which accordingly also determines the path of the driver 7 during the transferring process. Considered from its start, the guide rail 9 extends in the transfer direction I approximately parallel to the conveyor path 3. It then curves at different radii R1, R2, etc. in a sine-shaped manner as it proceeds away from the conveyor belt 3 of the first conveyor path 1 in the direction of the second conveyor path 2 and ends to the side of the conveyor belt 3 of the second conveyor path 2 prior to the start of the conveyor belt 3 of the second conveyor path 2.

The two radii R1, R2 shown in the drawing are dimensioned so that the load carrier is first deflected slightly and accordingly gently from the original transporting direction on the first conveyor path 1 in the direction of the second conveyor path 2 and then more sharply as the transfer progresses. This process is indicated by the radii R1, R2, wherein R1 is consequently greater than R2. Since the curvature of the guide rail 9 is freely adaptable to the requirements of the transfer process, it would also be possible to increase the radius again at the end of the transfer movement of the drivers 7 in order to optimize the transition to the following conveyor path 2.

Furthermore, it will be seen from FIG. 1 that a guide strip 10 is arranged, as seen in the transfer direction, in the region behind the transfer device 5 on the first conveyor path 1 directly to the side of the conveyor belt 3. On the one hand, this guide strip 10 serves to guide the conveyor belt 3 so that the latter is not drawn in the direction of the driver 7 of the transfer device 5 by the load carrier 4 to be transferred. On the other hand, the load carrier 4, which has a recess in the region of its support surface 13 constructed as a groove 14 (see FIG. 3) which is continuous in the longitudinal direction, is guided by means of this guide strip 10.

Figure 2:
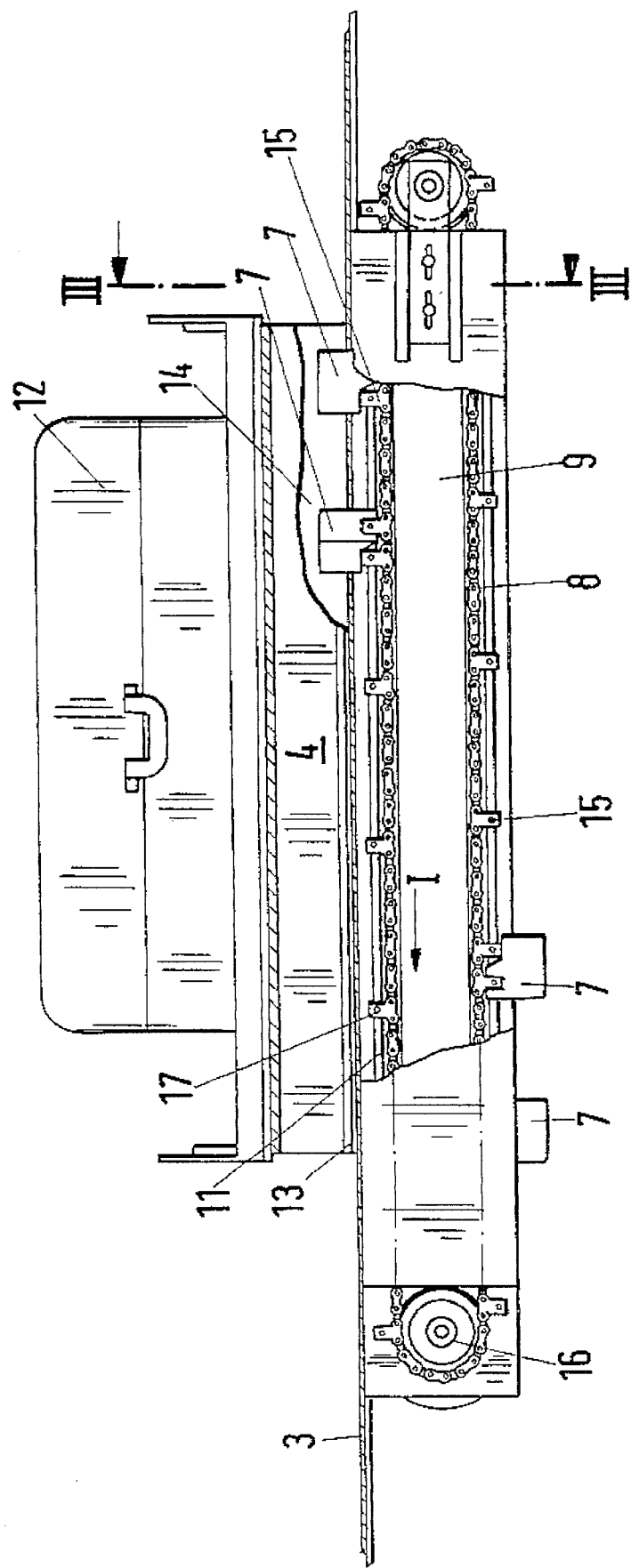
FIG. 2 shows a section of FIG. 1 along the section line II—II from the region of the transfer device.

FIG. 2 shows a section along the guide rail 9 of the transfer device 5 according to section line II—II in FIG. 1. A load carrier 4 is also shown in this drawing. The load carrier 4 is preferably constructed as a container serving to transport piece goods, in particular luggage 12. The load carrier 4 has wedge-shaped grooves 14 in its support surface 13 which are aligned in the longitudinal or main transporting direction of the load carrier 4 and continue along the entire length of the support surface 13 of the load carrier 4. A driver 7 formed by two parts can be moved into the groove 14 in a frictional-locking manner for transferring the load carrier 4 to the branch-off second conveyor path 2. The driver parts 7, whose longitudinal dimension is aligned parallel to the transfer direction I, are preferably constructed as plates. The driver parts 7 are connected with the traction mechanism 8 one after the other, as seen in the transfer direction I, and at a distance from one another via fastening brackets 15. The distance of the driver parts 7 from one another is less than one third the length of the load carrier 4. The traction mechanism 8 is continuous and is guided at the ends of the guide rail 9 via deflecting wheels 16. Additional fastening brackets 15 which are directed outward with reference to the circulating traction mechanism 8 are provided along the course of the traction mechanism 8. A pin 17 which is aligned transversely to the guide rail 9 is supported at the fastening brackets 15 in bore holes and the traction mechanism 8 is guided in guide grooves 11 of the guide rail 9 via the ends of the pins 17 which project laterally out of the fastening brackets 15. FIG. 2 further shows that two pairs of drivers 7 are arranged at the traction mechanism 8 so as to be uniformly distributed along its circumference in order to increase the transfer capacity by avoiding a returning movement for the drivers 7.

Figure 3:
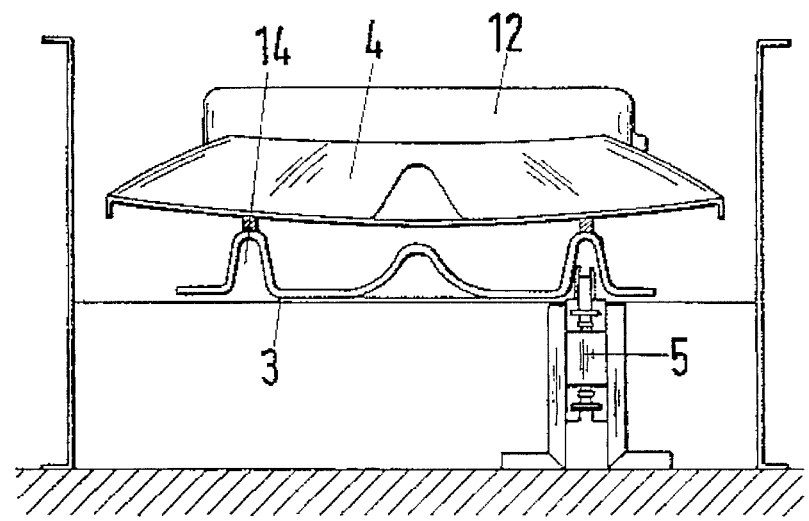
FIG. 3 shows a section of FIG. 2 along the section line III—III.

FIG. 3 shows a section of FIG. 2 through the guide rail 9 of the transfer device 5 according to section line III—III. In addition, the first conveyor path 1 is shown in cross section. This first conveyor path 1 has side cheeks for guiding the load carriers 4 which are connected with one another by a type of load platform on which the conveyor belt 3 runs. FIG. 3 clearly shows the construction of the load carrier 4, whose support surface 13 is provided with two grooves 14 arranged in the side area of the support surface 13. The distance between the two grooves 14 which are aligned parallel to one another is selected so as to be greater than the width of the conveyor belt 3 so that the load carriers 4 can be guided by means of the guide strips 10 (see FIG. 1) and transferred by the drivers 7 without interrupting the conveyor belt 3.

Figure 4:
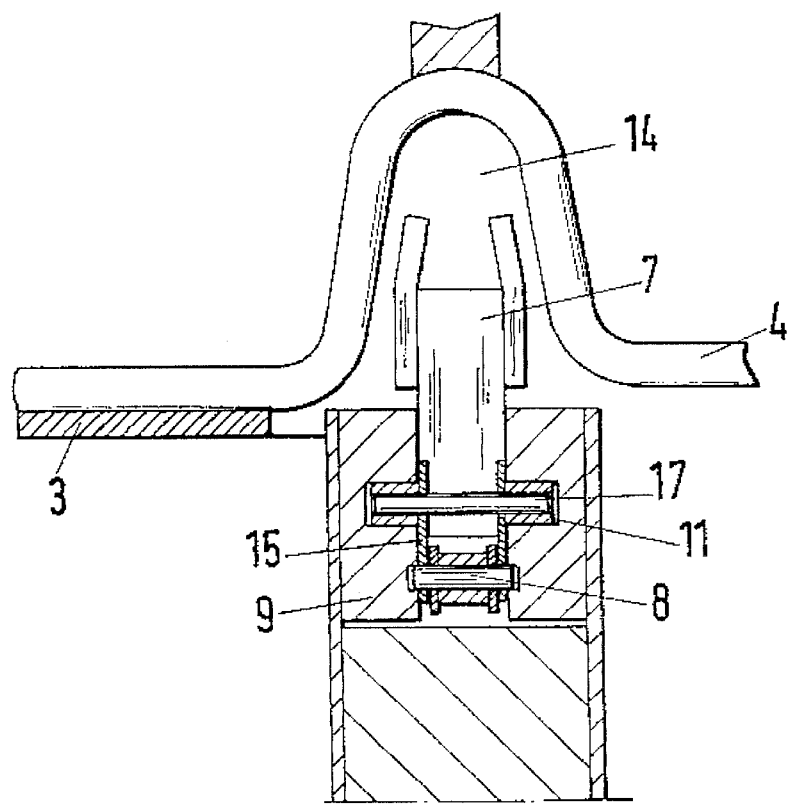
FIG. 4 shows an enlarged sectional view of FIG. 3 from the region of the drivers.

The guidance of the traction mechanism 8 in the guide grooves 11 of the guide rail 9 can be seen particularly clearly in FIG. 4 which shows an enlarged section from Figure 3 from the region of the driver 7. For this purpose, the traction mechanism 8 is connected via the fastening brackets 15 with a pin 17 supported thereon and the ends of the pin 17 are guided in one of the two guide grooves 11 incorporated opposite one another in the guide rail 9.

The operation of the transfer device 5 according to the invention will be described more fully in the following with reference to a transfer process for a load carrier 4. A load carrier 4 which is to be transferred and is transported on the first conveyor path 1 reaches a sensor 18 directly preceding the transfer device 5. The sensor 18 is arranged adjacent to the first conveyor path 1 and controls the drive 6 of the transfer device 5 via a central control unit. If the load carrier 4 is to be transferred to the second conveyor path 2, the drive 6 is started by the sensor 18 via the central control unit. The drive 6 is controlled in such a way that the drivers 7 move from below into the rear third of the longitudinal groove 14 of the load carrier 4. The driver 7 and the conveyor belt 3 of the first conveyor path 1 first run substantially parallel to one another at the start of the guide rail 9 of the transfer device 5. Subsequently, the driver 7 is guided away from the conveyor belt 3 slightly at first and then more sharply in the direction of the second conveyor path and the first driver, as seen in the transfer direction I, is accordingly pressed against the left-hand side wall of the groove 14 and the rear driver 7 is pressed against the right-hand side wall of the groove 14 in a frictional-locking manner. This frictional engagement of the drivers 7 with the groove 14 is reinforced by the engagement of the drivers 7 in the rear third of the groove 14 and by the resulting counteracting inertia forces of the load carrier 4 which first tries to move in the direction of the first conveyor path 1. The load carrier 4 is drawn away from the conveyor belt 3 in the direction of the start of the second conveyor path 2 along the guide rail 9 by the drivers 7 engaging with the groove 14, the end of the load carrier 4 being taken over by the conveyor belt 3 of the second conveyor path. When approximately two thirds of the load carrier 4 are supported on the conveyor belt 3, the drivers 7 are moved out of the groove 14 from below and the load carrier is transported further on the second conveyor path 2.

Within the scope of the present invention, the load carrier 4 can also be provided with a slot-shaped recess which terminates in the front half of the load carrier and the driver can accordingly be constructed in the manner of a pin. Further, it is possible to construct the driver as a hook, the complementary recess being arranged in a side wall of the load carrier.

The invention is not limited by the embodiments described above which are presented as examples only but can be modified in various ways within the scope of protection defined by the appended patent claims.

We claim:

1. A device for transferring load carriers between first and second conveyor paths arranged at an angle relative to one another, each load carrier having a support surface with a recess formed therein as an elongated groove, comprising:

at least one movable guide element;

drive means for moving the guide element in a transporting direction of the load carriers on the first conveyor path and in a direction of the second conveyor path so as to transfer the load carriers into the second conveyor path, the guide element being constructed as a driver which has an elongated shape relative to a transfer direction and is movable into the recess in the load carrier in a frictional-locking manner for transfer of the load carrier; and, a curved guide rail on which the driver can be driven, the curved guide rail being curved so as to guide the driver from the first conveyor path to the second conveyor path.

2. A device according to claim 1, wherein the driver is adapted to project upwardly into a transporting path of the first and second conveyor paths during the transfer of the load carrier.

3. A device according to claim 1, wherein the load carrier has end sides, the recess being formed as a groove that connects the end sides of the load carrier and extends in the transporting direction of the load carrier.

4. A device according to claim 3, wherein the driver has two driver parts which are arranged one after the other and at a distance from one another in the transfer direction, the distance between the driver parts being less than one third the length of the load carrier.

5. A device according to claim 1, comprising a plurality of the drivers, the drivers being plate-shaped and aligned with their longitudinal dimension in a transfer direction.

6. A device according to claim 1, and further comprising a circulating traction mechanism which is guided at the guide rail, the driver being fastened to the traction mechanism.

7. A device according to claim 6, wherein the guide rail has guide grooves, the traction mechanism including a chain connected with a plurality of pins arranged so as to be uniformly distributed along the chain circumference and guided in the guide grooves arranged in the guide rail.

8. A device according to claim 7, wherein the chain is a side-curve chain.

9. A device according to claim 1, wherein the guide rail curves increasingly in one of a continuous and portionwise manner from the first conveyor path toward the second conveyor path.

10. A device according to claim 3, wherein the first conveyor path is a conveyor belt that has a width corresponding to approximately half the width of the load carrier, the groove being arranged outside a portion of a support surface of the load carrier which rests on the conveyor belt.

11. A device according to claim 10, and further comprising a guide rail for the driver arranged on a side of the conveyor belt of the first conveyor path that faces the second conveyor path so as to commence adjacent to the conveyor belt, curve toward the second conveyor path and end near a conveyor belt of the second conveyor path and on a side adjacent to the conveyor belt of the second conveyor path remote of the first conveyor path.

12. A load carrier transfer system, comprising, in combination:

at least one load carrier having a support surface with a longitudinally running recess therein;

at least one movable driver engagable with the recess in the load carrier in a frictional-locking manner;

drive means for moving the driver in a transporting direction;

and, a curved guide rail on which the at least one movable driver can be driven, the guide rail being curved so as to guide the driver from a first conveyor path to a second conveyor path.

* * * * *